United States Patent [19]

Kamada

[11] Patent Number: 5,094,128
[45] Date of Patent: Mar. 10, 1992

[54] CONTROL APPARATUS FOR AUTOMATIC TRANSMISSION

[75] Inventor: Shinya Kamada, Hiroshima, Japan

[73] Assignee: Mazda Motor Corporation, Hiroshima, Japan

[21] Appl. No.: 540,265

[22] Filed: Jun. 19, 1990

[30] Foreign Application Priority Data

Jun. 26, 1989 [JP] Japan .................................. 1-162900

[51] Int. Cl.⁵ ............................................. B60K 41/06
[52] U.S. Cl. .................................................. 74/866
[58] Field of Search ...................................... 74/866

[56] References Cited

U.S. PATENT DOCUMENTS

4,222,292 9/1980 Will et al. ............................ 74/866
4,665,777 5/1987 Kikuchi et al. ..................... 74/866
4,694,709 9/1987 Kikuchi et al. .
4,800,497 1/1989 Koori et al. ....................... 74/866 X

Primary Examiner—Allan D. Herrmann
Assistant Examiner—Ryan W. Massey

[57] ABSTRACT

A control apparatus for an automatic transmission having a torque converter is so adapted that first a comparatively high-speed change ratio is set when there is a range changeover between the reverse range R and a forward cruising range (e.g., D, S, or L). This comparatively high-speed change ratio is maintained until it is detected that the gear mechanism of the automatic transmission is substantially formed for this high change ratio. A transition is made to a low-speed change ratio after it is confirmed that the gear mechanism is substantially formed for the high change ratio. By virtue of this operation, the torque delivered by the output shaft of the transmission assumes a step-shaped form in the course of the transition from the high-speed change ratio to the low-speed change ratio. As a result, a large transmission shock is minimized.

8 Claims, 7 Drawing Sheets

CONTROL APPARATUS FOR AUTOMATIC TRANSMISSION

BACKGROUND OF THE INVENTION

This invention relates to a control apparatus for an automatic transmission having a torque converter. More particularly, the invention relates to measures for alleviating shock produced when a select lever is manually operated to make a range changeover from the R range to the D range, by way of example.

Several technical proposals have been made for a control apparatus for an automatic transmission of this type in Japanese Patent Application Laid-Open (KOKAI) Nos. 61-65947, 61-65948, 61-65949, and 61-65950 U.S. Pat. No. 4,694,709 corresponds to KOKAI Nos. 61,65947 and 61-65948, while U.S. Pat. No. 4,665,777 corresponds to KOKAI Nos. 61-65949 and 61-65950. The proposed control apparatus are adapted to mitigate shock produced when a changeover is made from the neutral (N) range to a traveling range (e.g., the D range).

The proposed control apparatus perform control as follows when the above-mentioned range changeover is made: When the N→D range changeover is made, the change ratio is temporarily set to a high speed (third speed, for example). Since the transmission is in the neutral state up to the moment of the speed change, the rotational frequency (rev count) N of the converter turbine should be a certain value ($n_0$, for example) at the moment the change ratio is set. Accordingly, when the change ratio is set to a high speed, such as third speed, the turbine rotational frequency N drops from the value $n_0$ owing to the load upon the gear mechanism of the transmission. The arrangement is such that a changeover is made to first speed at the moment the turbine rotational frequency N falls to a set value (e.g., $n_1$). In other words, it is possible to gently raise the driving torque transmitted from the automatic transmission to the wheels by first setting the change ratio to a high speed (third speed) and then subsequently changing the ratio to first speed. Shock at the moment of the range changeover is thus mitigated effectively.

The range changeover operation includes changeovers other than the shift from neutral N to drive D. For example, a changeover frequently made is to shift from the reverse range R to the drive range D by rapidly passing through the neutral range N. Since this changeover operation entails shifting from reverse range to drive range via the neutral range, it includes what is referred to as an "N→D" exercise. Accordingly, if the afore-mentioned arrangement (Japanese Patent Application Laid-Open No. 61-65949), in which a high speed is traversed in order to prevent transmission shock at the N→D shift, functions as described, shock at the time of the R→N→D range changeover should be alleviated effectively.

In actuality, however, it has been found that there are instances in which the R→D changeover and D→R are accompanied by a comparatively large transmission shock.

Accordingly, the inventor has carried out extensive research and, as a result, has clarified the cause of this transmission shock. Specifically, the cause of shock is that, at the time of the R→D changeover, the turbine rotational frequency N falls to a value lower than the set rotational frequency value $n_1$ which ought to prevail when the shift is made from the above-mentioned third speed to first speed.

More specifically, according to the above-mentioned prior changeover control apparatus the N→D or R→N→D changeover is made by first setting the change ratio to third speed and then altering the change ratio to first speed at the moment the turbine rotational frequency falls to $n_1$. This changeover rotational frequency is set to a low value owing to the requirement that the vehicle not be propelled forward in third speed. In the reverse range R prior to performing the changeover, stopping of the vehicle is accompanied by stopping the rotation of the turbine shaft, and therefore the rotational frequency is zero. When the R→D changeover is made, the change ratio is set to third speed and the turbine rotational frequency begins to rise, as mentioned above. Since $n_1$ is set to a low value, the rotational frequency N promptly attains this changeover rotational frequency $n_1$.

When control is performed in such a manner that the change ratio is altered to first speed merely by having the turbine rotational frequency N attain the changeover rotational frequency $n_1$, the time for the gear mechanism of the transmission to be set to third speed is essentially shortened. As a consequence, control by way of traversing the high-speed change ratio, namely control performed to gently raise torque transmitted to the wheel, is essentially not carried out. The reason is as follows: In the gear mechanism of an automatic transmission, a fixed period of time is required in order for oil pressure to act upon clutches and brakes serving as friction elements and for these elements to essentially begin working. When, in spite of this, the time during which high speed such as third speed is in effect is short, third speed is maintained in a state in which these friction elements are not yet working. As a result, the torque transmitted to the wheels is essentially zero in third speed. Since a large torque acts upon the wheels once at the moment the change is made to first speed, torque shock becomes large in magnitude.

Though the R→D changeover is taken as an example in the foregoing, the reverse and forward operations are merely reversed when a D→R changeover is performed, and therefore the circumstances are similar to those which prevail at the time of the R→D changeover. That is, transmission shock is produced not only at the R→D changeover but also at the D→R changeover.

SUMMARY OF THE INVENTION

An object of the present invention is to provide a control apparatus for an automatic transmission in which shock is mitigated effectively when a range changeover is performed between reverse range and forward drive range.

Another object of the present invention is to provide a control apparatus for an automatic transmission in which, along with control for altering a change ratio to a low speed after it is temporarily set to a high speed when making a changeover between reverse range and forward drive range, a step-wise torque transmission from high speed to a low-speed stage is performed with assurance by setting the change ratio to the high speed in a reliable manner.

According to the present invention, the foregoing objects are attained by providing a control apparatus for an automatic transmission having:

(a) a torque converter for receiving engine output and converting the torque thereof;

(b) a transmission gear mechanism coupled to an output shaft of the torque converter;

(c) change ratio changeover means for setting a plurality of change ratios by changing over a power transmission path of the transmission gear mechanism; and (d) operating means for switchingly selecting one of a plurality of drive ranges by a manual operation;

the control apparatus comprising:

(e) range changeover operation discriminating means for detecting that a range changeover has been performed between a reverse range and a forward travel range by the operating means;

(f) changeover-completion discriminating means for detecting substantial completion of a change ratio changeover operation in the transmission gear mechanism; and (g) control means operatively connected to the change ratio changeover means, range changeover operation discriminating means and changeover-completion discriminating means; wherein the control means:

(h) controls the change ratio changeover means so as to set a comparatively high-speed change ratio when the above-mentioned range changeover is detected; and (i) controls the change ratio changeover means to a comparatively low-speed change ratio lower than the high-speed change ratio when substantial completion of the changeover operation in the transmission gear mechanism is detected by the changeover-completion discriminating means.

More specifically, when range changeover is detected, the control means exercises control so as to set a comparatively high-speed change ratio, and performs control in such a manner that this high-speed change ratio is maintained until the substantial completion of the changeover operation in the gear mechanism is detected, upon which a transition is made to a low-speed change ratio. In this way a step-wise increase in the transmitted torque is performed with assurance and transmission shock is prevented.

A further object of the present invention is to provide a control apparatus in which the substantial completion of an operation for establishing a comparatively high-speed change ratio can be judged in a variety of variations in a gear mechanism.

Specifically, according to a first preferred embodiment of the present invention, the substantial completion of a change ratio changeover operation in the above-mentioned gear mechanism is judged to have occurred at the moment the rate of change in rotational frequency on the input side of the transmission gear mechanism attains a negative value.

According to a second embodiment of the present invention, the substantial completion of a change ratio changeover operation in the above-mentioned gear mechanism is judged to have occurred at the moment a predetermined period of time $T_M$ elapses from the moment the rate of change in rotational frequency on the input side of the transmission gear mechanism attains a negative value.

According to a third embodiment of the present invention, the substantial completion of a change ratio changeover operation in the above-mentioned gear mechanism is judged to have occurred at the moment the rotational frequency on the input side of the transmission gear mechanism becomes approximately equal to a predetermined rotational frequency N2 after the rate of change in the rotational frequency on the input side has attained a negative value.

In the second and third embodiments, the substantial completion of the change ratio changeover operation in the gear mechanism can be judged more reliably than in the first embodiment.

In a case where the time left in N is long even when the R→N→D range change is performed with the vehicle actually running, there will be instances where the turbine rotational frequency of the converter will already be fairly high at the moment the R→N→D range change is detected. In such cases the judgment of the substantial completion of the change ratio changeover operation in the gear mechanism must differ from that of the first, second and third embodiments.

Therefore, according to a fourth embodiment of the present invention, the rotational frequency N on the input side of the transmission gear mechanism when a range changeover is detected between the reverse range R and a forward drive range is compared with a predetermined value $N_1$. When the relation $N \rightarrow N_1$ is determined to hold, monitoring is performed to determine when the rotational frequency N on the input side falls to a predetermined value $N_3$. At the moment the relation $N < N_3$ is established, it is judged that the change ratio changeover operation has ended.

Other objects and advantages besides those discussed above shall be apparent to those skilled in the art from the description of preferred embodiments of the invention which follow. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Two embodiments in which the present invention is applied to an automatic transmission for performing shifting by control of oil pressure will now be described. These embodiments will be described while emphasizing operation in a case where a changeover is made from reverse range R to drive range D. However, the present invention is applicable also to a D→R changeover and to such range changes as R←L or R←S.

Operating Principle

The first and second embodiment are so adapted that when a changeover from the reverse range R to the drive range D is detected, first the change ratio is set to third speed, third speed is maintained until the gear mechanism within the transmission is "substantially formed" into third speed, and thereafter a shift is made to first speed. More specifically, according to these embodiments, the operation is as follows and is common to both:

(1): When the changeover from the reverse range R to the drive range D is sensed, first the change ratio is set to third speed.

(2): In a case where turbine rotational frequency N at the moment the changeover from the reverse range R to the drive range D was sensed was greater than $N_1$ ($\approx 500$ to 550 rpm), that is $N \geq N_1$, third speed is maintained until the turbine rotational frequency N falls below $N_3 \approx 330$ rpm).

(3): On the other hand, in a case where the turbine rotational frequency N at the moment the changeover from the reverse range R to the drive range D was sensed was less than $N_1$, that is $N < N_1$, it is judged that the gear mechanism of the automatic transmission has approximately been formed into third speed at the moment a rate of change $\Delta N$ in the turbine rotational frequency N becomes negative, that is $\Delta N < 0$.

In particular, in the first embodiment, the operation is as follows:

(4)-1: Upon passage of a fixed time period $T_M$ once the relation $\Delta N < 0$ has been established, formation of the gear mechanism to third speed is judged to be substantially complete and a shift is made to first speed.

In the second embodiment, the operation is as follows: (4)-2: At the moment the turbine rotational frequency N becomes $N_2$ ($\Delta 300$ rpm) after the relation $\Delta N < 0$ is established, formation of the gear mechanism to third speed is judged to be substantially complete and a shift is made to first speed.

The manner in which $N_1$ is set will now be described with reference to FIG. 1.

Figure 1:
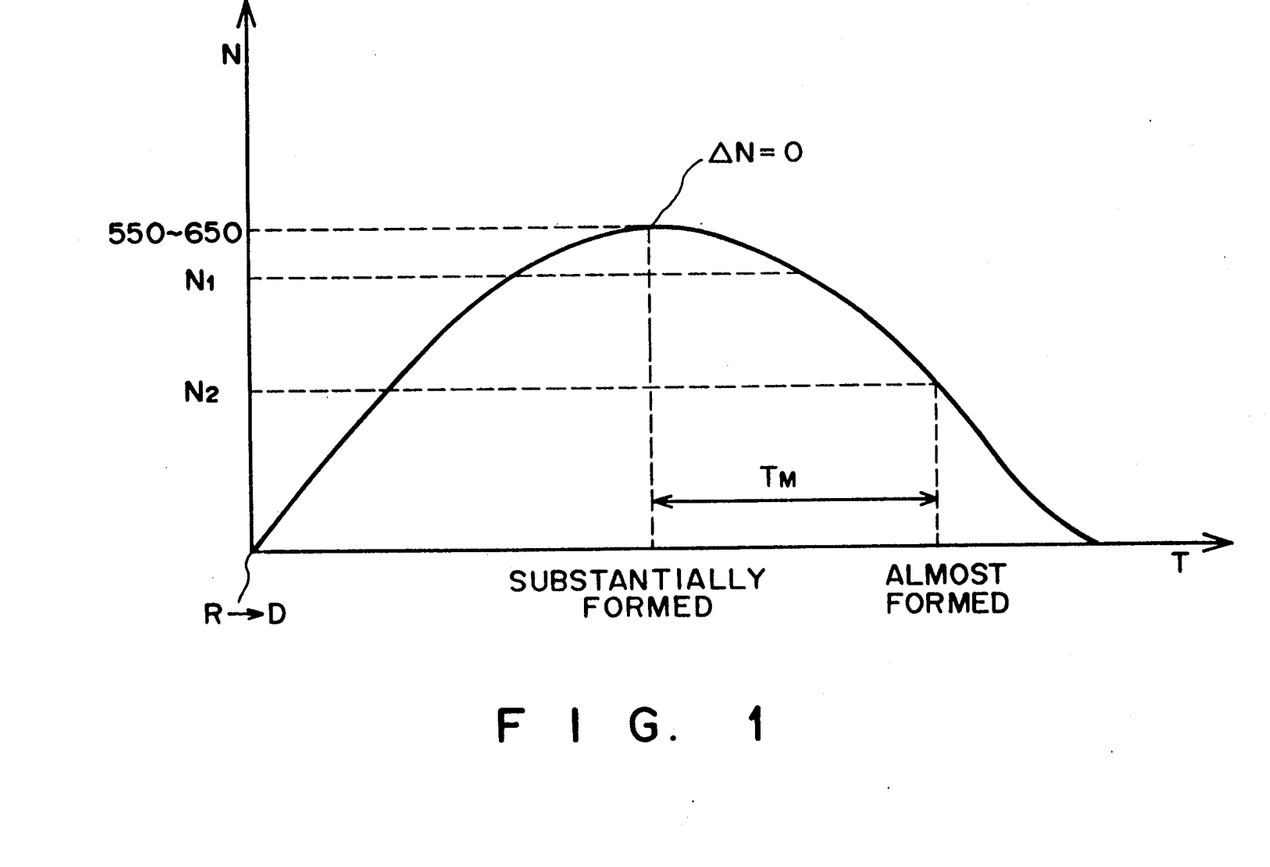
FIG. 1 is a diagram illustrating the operating principle of two embodiments of the present invention.

FIG. 1 is a diagram illustrating the change in turbine rotational frequency N with respect to time after an R→D changeover is detected and the transmission has been set to third speed. Since the vehicle generally is at rest at the moment the R→D changeover is detected, N is zero when this changeover is detected. When the transmission is set to third speed, the friction elements in the transmission operate and the braked state of these elements is released, as a result of which the turbine rotational frequency N rises. As the engaged state of these friction elements approaches that set for third speed, the rate ($\Delta N$) of the increase in turbine rotational frequency N declines and $\Delta N$ eventually becomes equal to zero ($\Delta N = 0$). In other words, the turbine rotational frequency N peaks. In this state, the transmission can be said to be "set approximately to third speed". The turbine rotational frequency N then declines as the transmission proceeds to the finally formed state for third speed.

In the present embodiments, the moment at which $\Delta N = 0$ is established is defined as being that at which the gear mechanism is "substantially" formed for third speed, and the moment at which $N = N_2$ is established after $\Delta N = 0$ is defined as being that at which the gear mechanism is "almost" formed for third speed.

In these embodiments, the turbine rotational frequency N at idling is assumed to be 600 to 650 rpm, by way of example. Accordingly, as mentioned above, it will suffice to adopt $N_1 \approx 500$ to 550 rpm as the rotational frequency $N_1$ serving as the criterion for judging whether turbine rotational frequency N rises and then falls following detection of the R→D changeover or falls after detection of the R→D changeover. In the first embodiment, elapsed time $T_M$ ($\approx 0.2$ to 0.3 sec) from the moment the turbine rotational frequency N peaks, which elapsed time is for judging that formation of the gear mechanism into third speed has "almost" been achieved, is found based on experience. The turbine rotational frequency $N_2$ in the second embodiment is equal to a turbine rotational frequency which should be decreasing at elapse of the time $T_M$ in the first embodiment. Though various values can be taken on depending upon a particular transmission, $N_2 \approx 300$ rpm shall hold in the second embodiment.

The construction and operation of these two embodiments will now be described in detailed and specific terms in accordance with the drawings from FIG. 2 onward.

System Configuration

Figure 2:
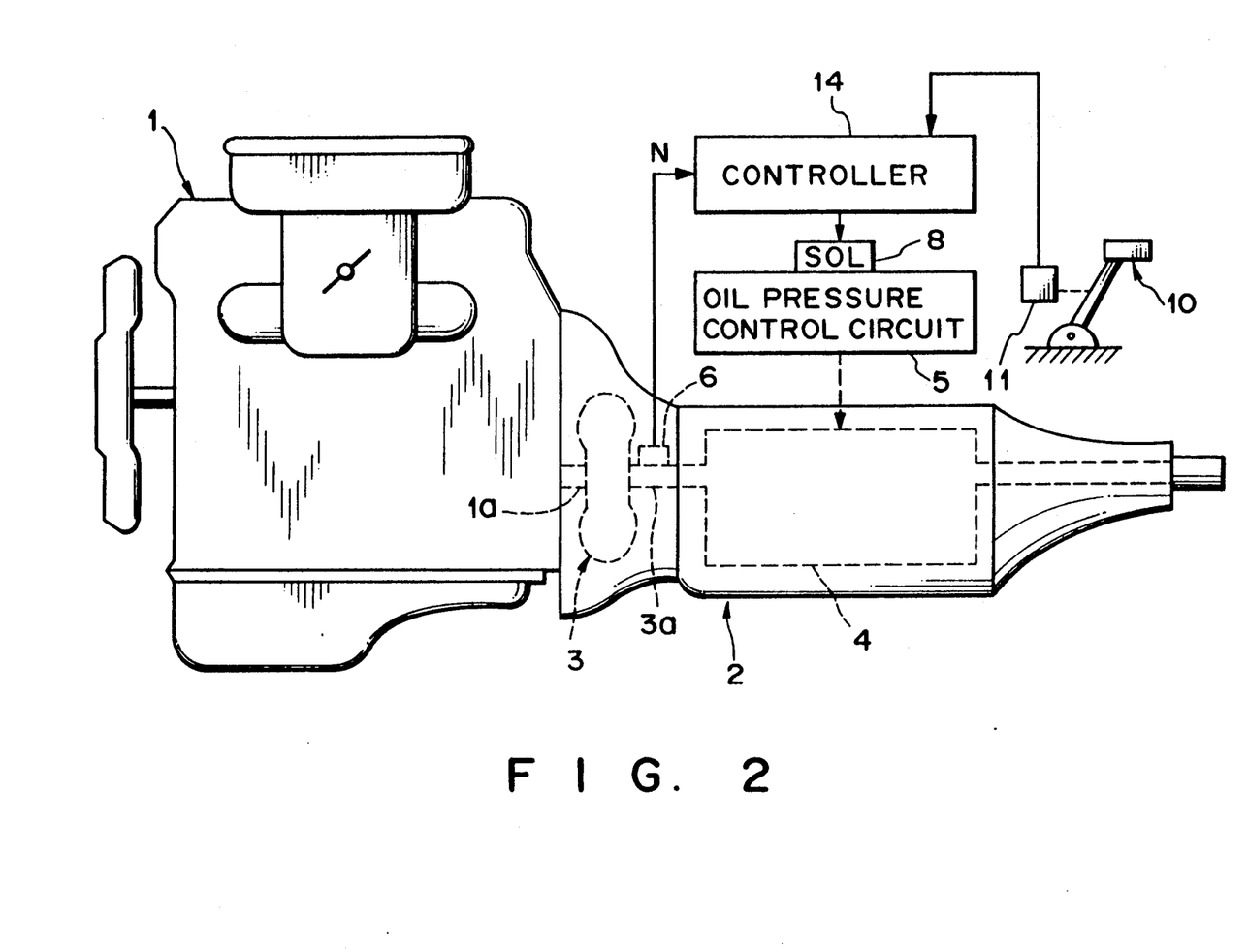
FIG. 2 is a diagram showing the overall construction of the system of the first and second embodiments of the present invention.

FIG. 2 is a system diagram showing the hardware construction common to the first and second embodiments. Here the transmission control system primarily comprises an engine body 1, an automatic transmission 2, an oil pressure control circuit 5, a controller 14 for controlling the oil pressure control circuit 5, and a select lever 10 for selecting the driving range.

As shown in FIG. 2, the automatic transmission 2 is connected to an output shaft 1a of the engine 1. The transmission 2 comprises a torque converter 3 connected to the output shaft 1a of the engine 1, and a planetary geartype transmission gear mechanism 4, such as one having four forward speeds and one reverse speed, coupled to an output shaft (turbine shaft) 3a of the torque converter 3. The transmission gear mechanism 4 has a plurality of friction elements (not shown) for forming the change ratio. These friction elements are controlled by an oil pressure control circuit 5 so as to be engaged and disengaged. The oil pressure control circuit 5 is equipped with a plurality of electromagnetic valves SOL 8. By controlling the supply and discharge of oil pressure to and from the friction elements by controlling the ON/OFF action of the electromagnetic valves SOL, the power transmission path in the transmission gear mechanism 4 is changed over so as to change over and set a plurality of change ratios.

In FIG. 2, the select lever 10 is operated manually by the driver. The range of the automatic transmission can be selectively changed over to any of five ranges by the select lever 10. These ranges are, by way of example, a P (parking) range, an R (reverse) range, a D (first through fourth forward speeds obtained by automatic shifting) cruising range, an S (first through third forward speeds obtained by automatic shifting) cruising range, and an L (first and second forward speeds obtained by automatic shifting) cruising range. In other words, range position is selected in the order P←R←N←D←S←L by the select lever 10.

The range manually selected by the select lever 10 is detected by an inhibitor switch 11. A range signal detected by the inhibitor switch 11 enters the controller 14, which has an internal CPU. The plurality of electromagnetic valves SOL 8 of the oil pressure control circuit 5 are controlled by the controller 14. Turbine rotational frequency N is detected by the sensor 6.

Control Procedure of First Embodiment

Figure 3:
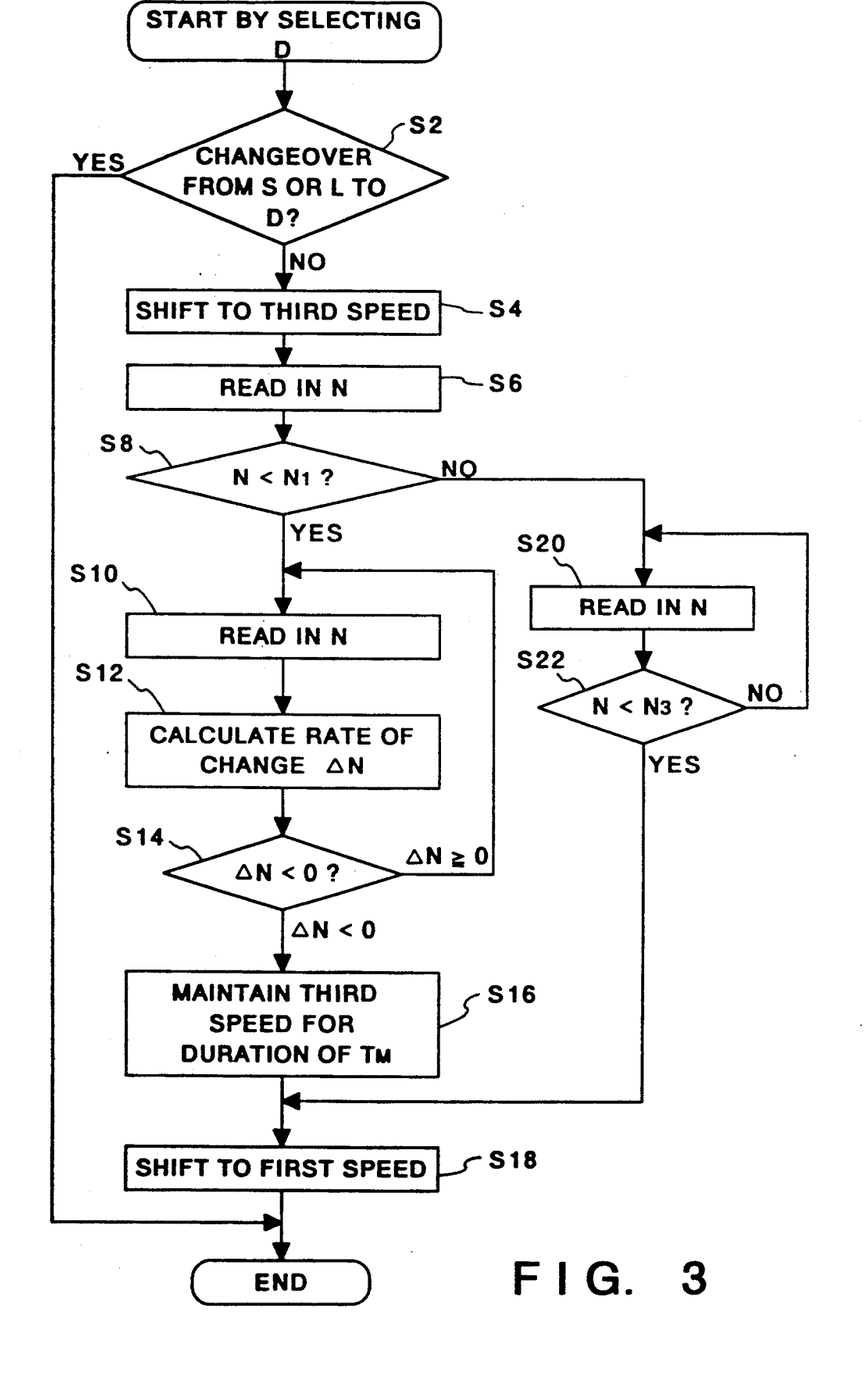
FIG. 3 is a flowchart illustrating control for setting change ratio at the time of an R→D changeover according to the first embodiment.

A first embodiment of transmission control when range position is changed from R to D will be described based on the control flow of FIG. 3. This control flow is started by moving the lever 10 to the D position.

First, at step S2 of the flowchart, it is determined from which range the lever has been moved to be placed in the D range. Specifically, it is determined at step S2 whether the lever has been moved from the S position or L position to the D position. The N→D changeover or R→D changeover is judged to have occurred only if the answer at step S2 is NO, in which case the program proceeds to step S4. In the present embodiment, the selection positions are arrayed in the order P←R←N←D←S←L, as mentioned above. Therefore, when it is judged that the lever has not been moved from the S or L position to the D position at step S2, this means that the N←D or R←D changeover in which the problem of transmission shock is encountered can be judged to have occurred. The change ratio is switched to third speed at step S4 for the purpose of controlling the shock that accompanies the range changeover. In other words, though there is no decision at the stage of step S4 as to whether the changeover performed is N→D or R→D, the change ratio is set to third speed, which is a comparatively high speed.

Thereafter, turbine rotational frequency N (this rev count is the turbine rotational frequency at the moment the D-range changeover is detected) is read in at step S6.

The turbine rotational frequency N is compared with a set value $N_1$ at step S8. As mentioned above, $N_1$ is about 550 rpm. Inn a case where $N \geq N_1$ holds, the turbine rotational frequency will already be high at the moment the range changeover is detected, and therefore this means that the N→D changeover will be judged to have occurred. Conversely, when $N < N_1$ holds, this means that the R→D changeover will be judged to have occurred.

First, a case in which it is determined that $N < N_1$ holds, namely a case in which it is determined that the R→D changeover has been performed, will be described in accordance with the procedure from step S10 to step S18. In this case, the turbine rotational frequency N should rise and then fall, as explained earlier with reference to FIG. 1.

The loop composed of steps S10 to S14 is a procedure for detecting the timing at which the turbine rotational frequency N peaks, as explained with reference to FIG. 1. Such peak detection s performed by obtaining the rate of change $\Delta N$ in turbine rotational frequency N. That is, the turbine rotational frequency N is read in again at step S10 in order to calculate the change in N. The rate of change $\Delta N$ in N is then calculated at step S12. In this cycle of processing, the following holds:

$\Delta = $ (N obtained at step S88) $-$ (N obtained at step S6)

The sign of the rate of change $\Delta N$ is judged at step S14. In case of a positive value in which $\Delta N \geq 0$ holds, namely in a case where the turbine rotational frequency N is rising, the program returns to step S10 and the processing of steps S10 through S14 is repeated. Note that $\Delta N$ in this loop is as follows:

$\Delta N = $ (N obtained at step S10 of the present cycle) $-$ (N obtained at step S10 of the previous cycle).

When $\Delta N < 0$ is detected at step S14, the program proceeds to step S16, at which the change ratio is held at third speed for the duration of the predetermined time $T_M$. As mentioned earlier, a decline in the turbine rotational frequency N indicates that the friction elements in the transmission are acting and that a judgment will be rendered to the effect that "formation of third speed has substantially been carried out". In order for this judgment to be made with greater assurance, the change ratio is held at third speed for the time $T_M$. As described earlier in relation to FIG. 1, the time $T_M$ is found in advance as a time at which third speed is "almost formed" once the time $T_M$ has elapsed from the moment the turbine rotational frequency peak. Thus, if the time $T_M$ has elapsed, it is judged that "formation of third gear has almost been performed", as described with reference to FIG. 1.

Accordingly, at the moment the set time $T_M$ elapses, the change ratio is altered to first speed for the first time at step S18, and R→D range changeover control is terminated.

Next, a case will be described where the turbine rotational frequency at the moment changeover to the D range is detected is judged to be $N \geq N_1$ at step S8, namely a case where the N→D changeover has been made.

In a case such as this, the system waits for the turbine rotational frequency N to fall below a predetermined value $N_3$ in the loop of steps S20 and S22. Here it is assumed that $N_3$ is a value close to the above-mentioned $N_2$ ($\approx 300$ rpm). In this embodiment, $N_3 \approx 330$ rpm is adopted. When $N \geq N_3$ is judged to hold at step S22, a judgment is rendered to the effect that "formation of third speed has almost been performed" and the program proceeds to step S18, at which the change ratio is altered to first speed and N→D D range changeover control is ended.

Figure 4:
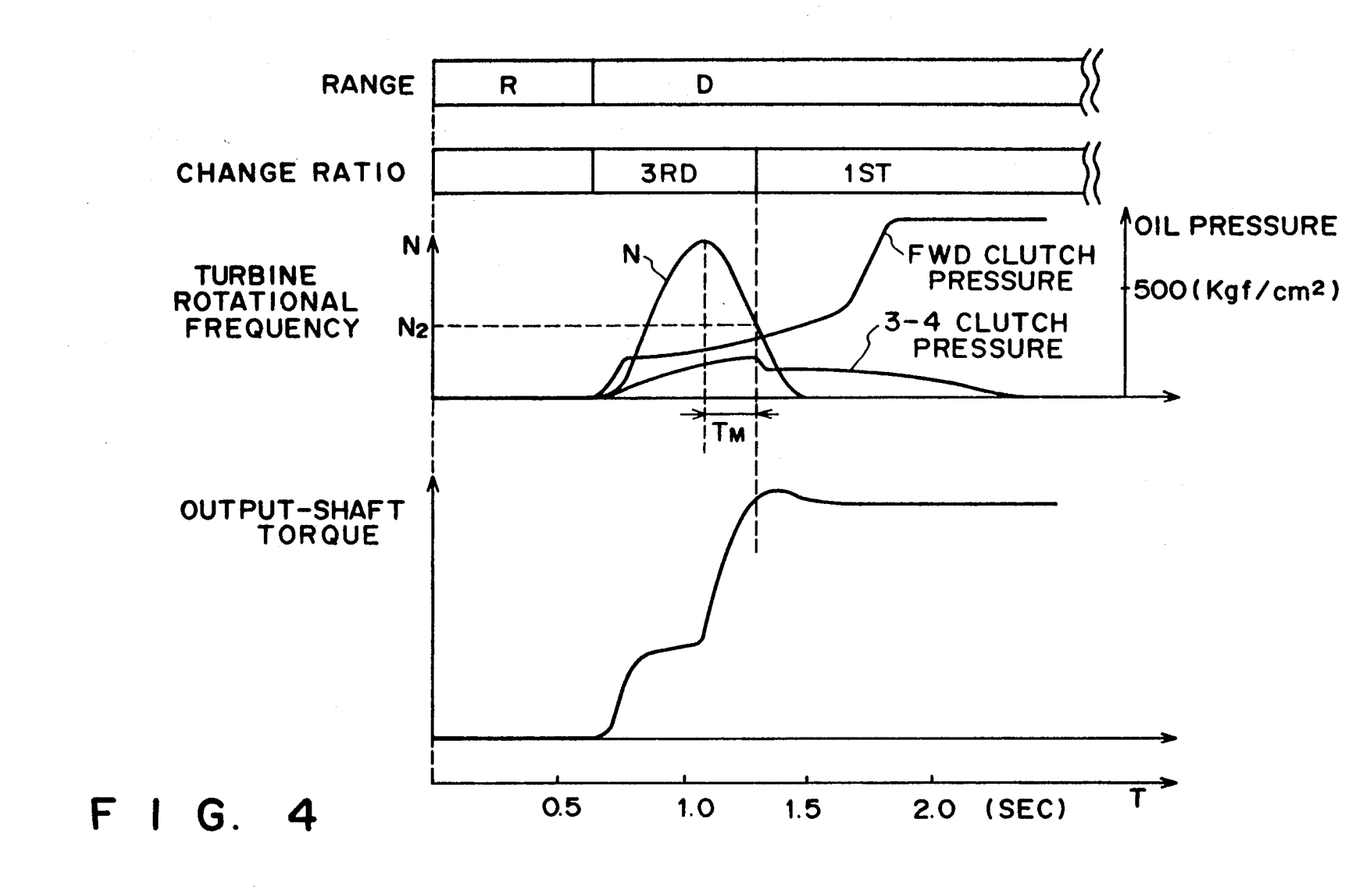
FIG. 4 is a timing chart for describing the control operation of the first embodiment.
Figure 5:
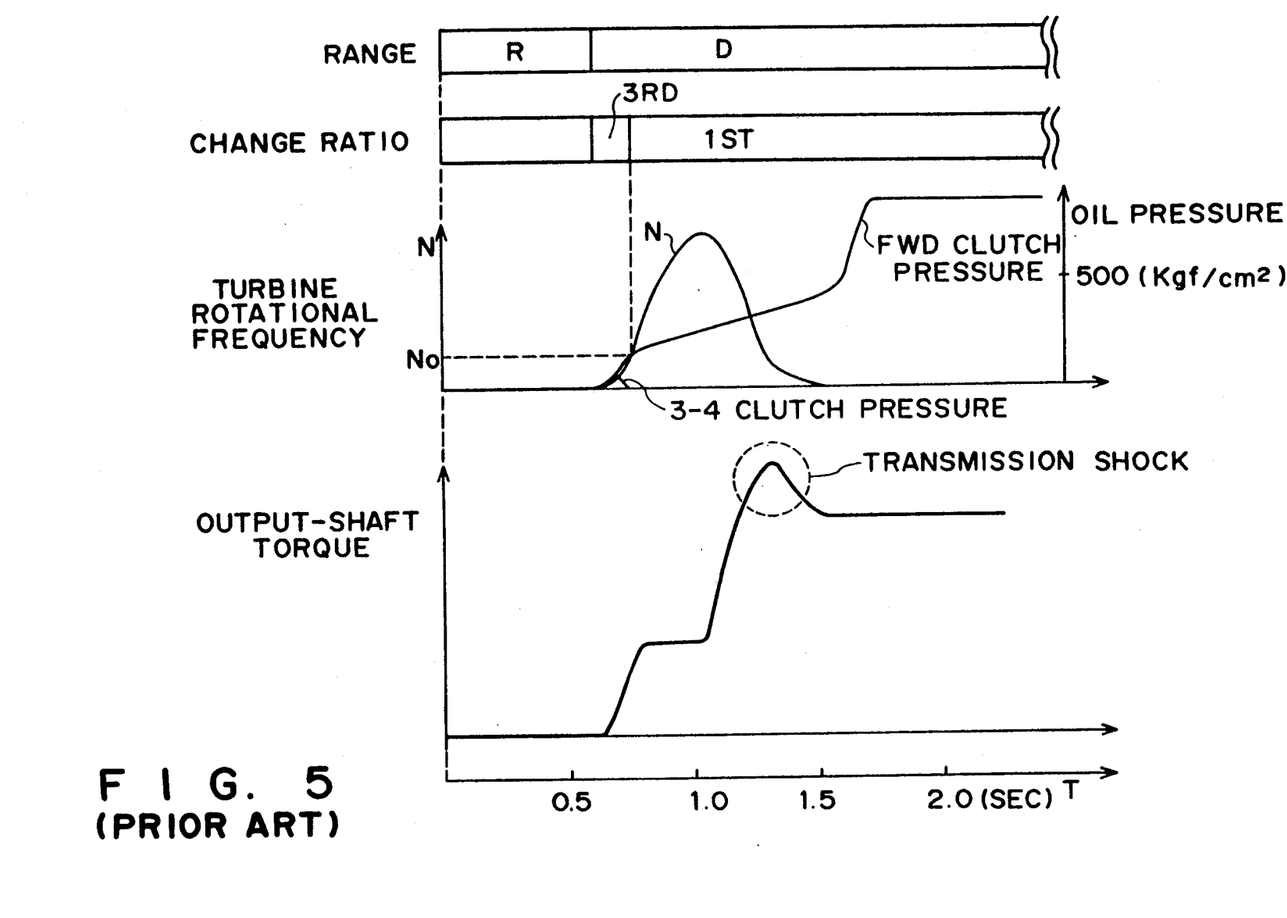
FIG. 5 is a timing chart for describing the manner in which transmission shock is produced in the prior art.

FIG. 4 is an operation timing chart in R→D changeover control according to the first embodiment. FIG. 5 illustrates a case where control using the prior control apparatus [Japanese Patent Application Laid-Open No. 61-65949 (U.S. Pat. No. 4,694,709)] is applied to R→D changeover control.

When the range is altered from R to D in the control apparatus of the prior art shown in FIG. 5, the change ratio is immediately set to third speed, but since the turbine rotational frequency N is zero at the moment of the changeover, N immediately attains the changeover rotational frequency $n_O$. As a result, there is a transition to first speed without 3-4 clutch pressure rising sufficiently, i.e., without sufficient formation of third speed. Thereafter, sufficient oil pressure is applied to the first-speed friction elements and, at the moment formation of first speed is almost completed, the output-shaft torque develops a large fluctuation at the portion indicated by the circle shown by the dashed line.

By contrast, in accordance with the embodiment of FIG. 4, the transition from third speed to first speed is set to take place upon elapse of the time $T_M$ clocked from the moment the turbine rotational frequency N falls. Therefore, in the course of the transition from third speed to first speed, the output-shaft torque rises in step-wise fashion, and shock is mitigated as a result.

In accordance with the first embodiment described above, the case described is one in which an R→D changeover occurs. However, operation is similar also in the reverse case, namely one in which a D→R changeover is made, and therefore this operation need not be described.

Control Procedure of Second Embodiment

Figure 6:
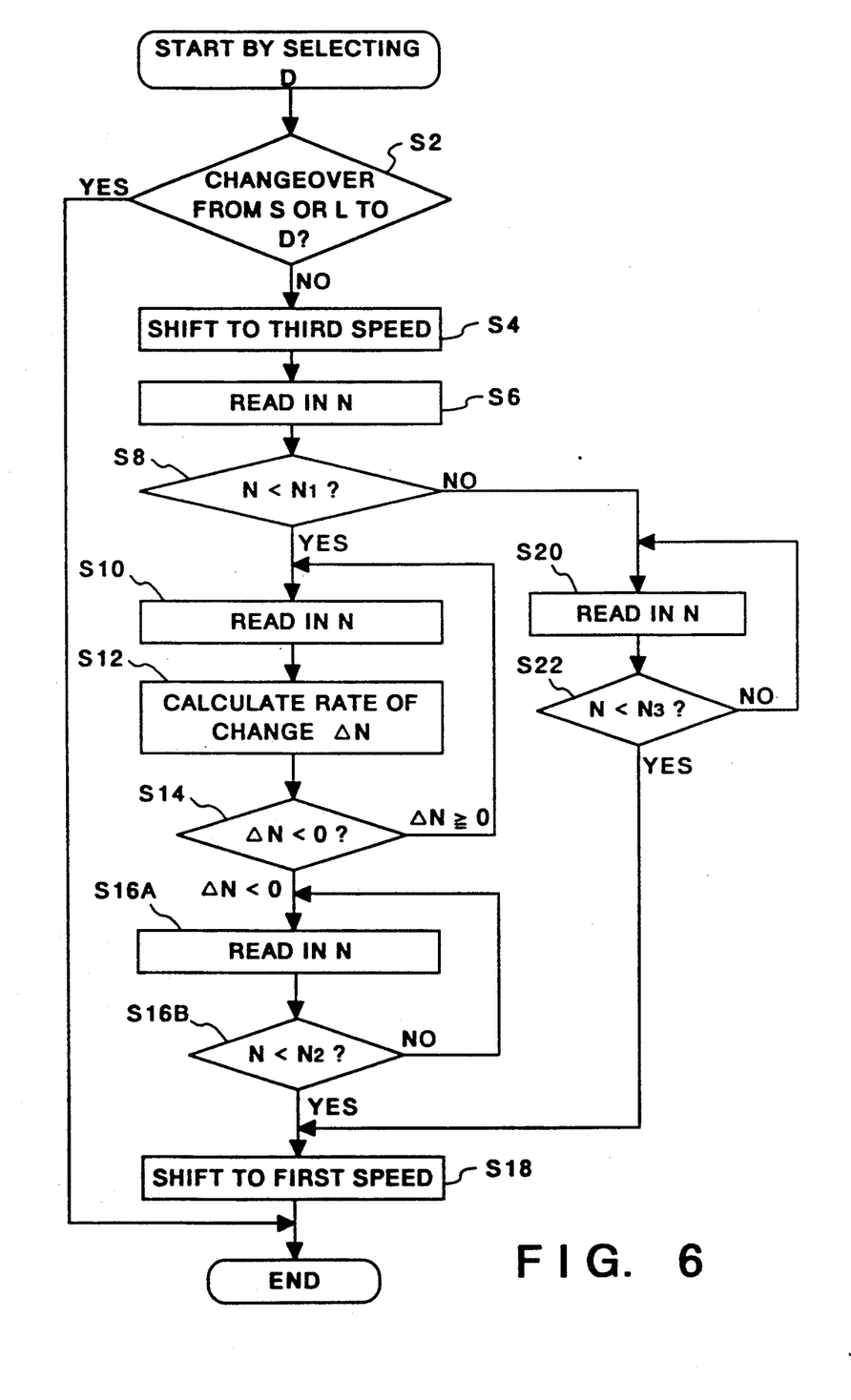
FIG. 6 is a flowchart illustrating a control procedure according to the second embodiment.
Figure 7:
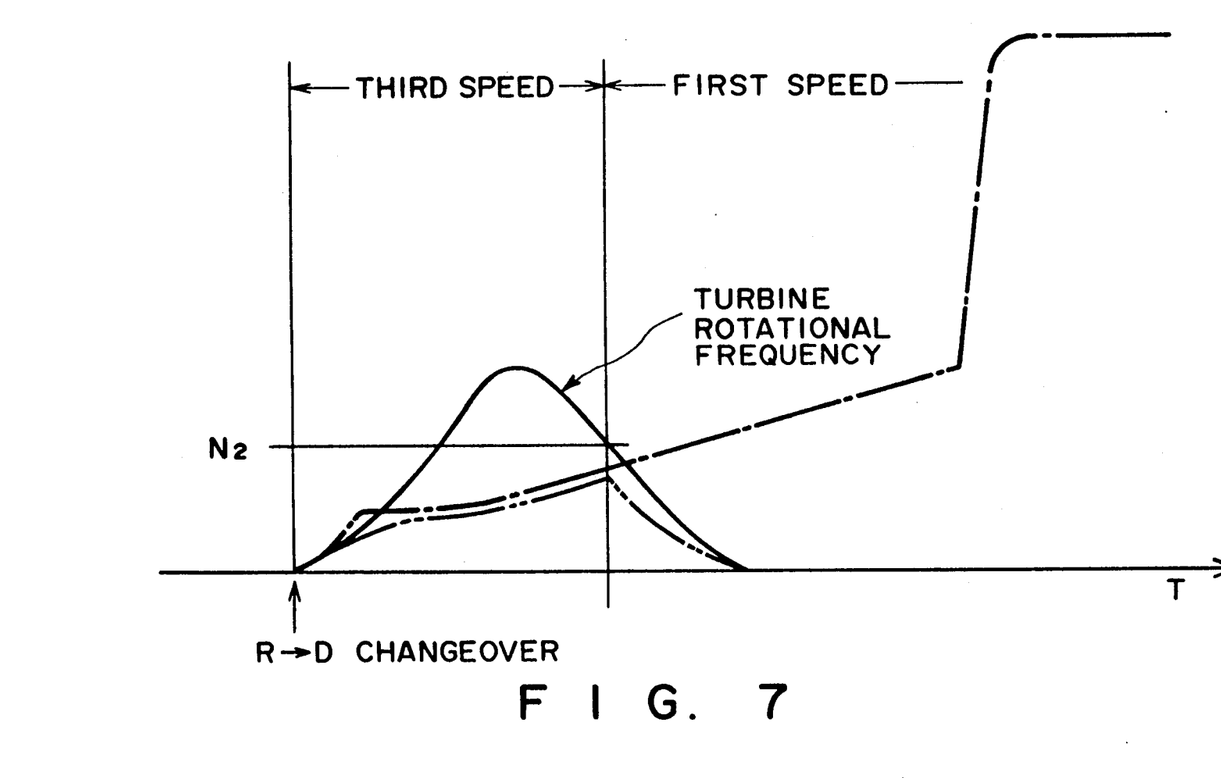
FIG. 7 is a timing chart for describing the control operation of the second embodiment.

A control procedure according to a second embodiment will now be described. In the first embodiment, third speed is maintained at step S16 until elapse of the predetermined time period $T_M$ clocked from the moment the rate of change $\Delta N$ in turbine rotational frequency becomes a negative value. In the second embodiment, third speed is maintained until the turbine rotational frequency N falls below the predetermined value N2 at steps S16A and S16B of FIG. 6 after the rate of change $\Delta N$ in turbine rotational frequency becomes a negative value The operations of other steps of the flowchart of FIG. 6 are similar to those of FIG. 1. Accordingly, the same step numbers in the control procedures of the first and second embodiments indicate the same control. Further, as described in association with FIG. 1, $N_2$ is a rotational frequency at which it can be judged that a time (corresponding to $T_M$ in the first embodiment) at which third speed has "almost been formed" has elapsed provided that the turbine rotational frequency has fallen to $N_2$ after peaking.

Accordingly, in the second embodiment also, just as in the first embodiment, when there is an R→D changeover, a high speed (third speed) is set for a duration of time which lasts from the moment of the changeover to the moment at which the turbine rotational frequency N falls to the set value $N_2$. As a result, the value of drive torque transmitted immediately after the R→D changeover can be reduced and shock produced at the time of this R→D changeover can be mitigated.

The present invention can be modified in various ways without departing from its spirit.

For example, though turbine rotational frequency N is used as the rotational frequency on the input side of the transmission gear mechanism in the first and second embodiments, it is also permissible to employ engine rev count (rpm).

Further, though the case described in the first and second embodiments is one in which an R→D changeover is made, the cruising range is not limited to the D position, for the invention can be similarly applied also to an R-S changeover and R-L changeover, and the cruising range can be the S range (automatic shifting up to third speed) and L range (automatic shifting up to second speed).

The present invention is not limited to the above embodiments and various changes and modifications can be made within the spirit and scope of the present invention. Therefore, to apprise the public of the scope of the present invention, the following claims are made.

What is claimed is:

1. A control apparatus for an automatic transmission having
   (a) a torque converter for receiving engine output and converting the torque thereof;
   (b) a transmission gear mechanism coupled to an output shaft of said torque converter;
   (c) change ratio changeover means for setting a plurality of change ratios by changing over a power transmission path of said transmission gear mechanism; and
   (d) operating means for switchingly selecting one of a plurality of drive ranges by a manual operation;
   the control apparatus comprising:
   (e) range changeover operation discriminating means for detecting that a range changeover has been performed between a reverse range and a forward travel range by said operating means;
   (f) changeover-completion discriminating means for detecting substantial completion of a change ratio changeover operation in said transmission gear mechanism; and
   (g) control means, operatively connected to said change ratio changeover means, range changeover operation discriminating means and changeover-completion discriminating means
   for (i) controlling said change ratio changeover means so as to set a comparatively high-speed change ratio when said range changeover between a reverse range and a forward travel range is detected and (ii) controlling said change ratio changeover means to a comparatively low-speed change ratio lower than the high-speed change ratio when substantial completion of the changeover operation in said transmission gear mechanism is detected by said changeover-completion discriminating means.

2. The control apparatus according to claim 1, wherein said changeover-completion discriminating means has:
   rate-of-change detecting means for detecting a rate of change inn rotational frequency on an input side of said transmission gear mechanism, wherein substantial completion of the change ratio changeover operation in said transmission gear mechanism is judged to have occurred at a moment at which the rate of change detected by said rate-of-change detecting means becomes a negative value.

3. The control apparatus according to claim 1, wherein said changeover-completion discriminating means has:
   rate-of-change detecting means for detecting a rate of change inn rotational frequency of an input side of said transmission gear mechanism; and
   means for monitoring elapse of a predetermined period of time from a moment at which the rate of change detected by said rate-of-change detecting means becomes a negative value;
   said changeover-completion discriminating means discriminating substantial completion of the change ratio changeover operation in said transmission gear mechanism at a moment that said predetermined period off time elapses after the rate of change in the rotational frequency on the input side of said transmission gear mechanism becomes a negative value.

4. The control apparatus according to claim 1, wherein said changeover-completion discriminating means further comprises:
   means for detecting rotational frequency and rate of change in rotational frequency on ann input side of said transmission gear mechanism; and
   means for comparing the rotational frequency on said input side with a predetermined rotational-frequency value;
   said changeover-completion discriminating means discriminating substantial completion of the change ratio changeover operation in said transmission gear mechanism at a moment that the rotational frequency on said input side becomes approximately equal to said predetermined rotation-frequency value after a rate of change in the rotational frequency on the input side of said transmission gear mechanism becomes a negative value.

5. The control apparatus according to claim 1, wherein said changeover-completion discriminating means is operatively connected to said range changeover operation detecting means and includes:
   means for detecting a rotational frequency on an input side of said transmission gear mechanism;
   first comparator means operatively connected to said control means for comparing the rotational frequency on the input side with a first predetermined rotational-frequency value; and
   second comparator means operatively connected to said first comparator means for comparing the rotational frequency on the input side with a second predetermined rotational-frequency value;
   wherein, when the rotational frequency on the input side of said transmission gear mechanism at such that occurrence of a range changeover between a reverse range and a forward travel range is detected by said range changeover operation detecting means and the relation of the rotational frequency being greater than or equal to the first predetermined rotational-frequency value is satisfied by said first comparator means, said second comparator means continues to compare the rotational frequency and the second predetermined rotational-frequency value until the relation of the rotational frequency being less than the second predetermined rotationalfrequency value is established; and
   wherein substantial completion of the change ratio changeover operation in said transmission gear mechanism is discriminated at the moment the relation of rotational frequency being less than the second predetermined rotational-frequency value is established.

6. The control apparatus according to claim 1, wherein said comparatively high-speed change ratio is third speed.

7. The control apparatus according to claim 1, wherein said comparatively low-speed change ratio is first speed.

8. The control apparatus according to claim 1, wherein said forward travel range is a D range.

* * * * *

UNITED STATES PATENT AND TRADEMARK OFFICE
CERTIFICATE OF CORRECTION

PATENT NO. : 5,094,128

DATED : March 10, 1992

INVENTOR(S) : SHINYA KAMADA

It is certified that error appears in the above-identified patent and that said Letters Patent is hereby corrected as shown below:

| | | |
|---|---|---|
| Col. 4, | line 3, | "N2" s/b --$N_2$--; |
| | line 24, | "N→$N_1$" s/b --N≥$N_1$--. |
| Col. 5, | line 21, | "N≥$N_1$" s/b --N≥$N_1$--; |
| | line 39, | "Δ" s/b --■--. |
| Col. 6, | line 6, | "$N_1$■500" s/b --$N_1$■500--; |
| | line 20, | "$N_2$■" s/b --$N_2$■--; |
| | line 65, | "P←R←N←D←S←L" s/b --P↔R↔N↔D↔S↔L--. |
| Col 7, | line 20, | "P←R←N←D←S←L" s/b --P↔R↔N↔D↔S↔L--; |
| | line 23, | "N←D or R←D" s/b --N→D or R→D; |
| | line 39, | "Inn" s/b --In--; |
| | line 39, | "≥" s/b --≥--; |
| | line 62 | (in formula), "S88" s/b --S8--; |
| | line 66, | "≥" s/b --≥--; |
| Col. 8, | line 30, | "≥" s/b --≥--; |
| | line 37, | "$N_3$■" s/b --$N_3$■--; |
| | line 42, | delete second occurrence of "D"; |
| Col. 10, | line 17 (claim 1), | after "means" add --,--; |
| | line 32 (claim 2), | "inn" s/b --in--; |
| | line 43 (claim 3), | "inn" s/b --in--; |
| | line 61 (claim 4), | "ann" s/b --an--; |
| Col. 11, | line 22 (claim 5), | after "such" insert --time--. |

UNITED STATES PATENT AND TRADEMARK OFFICE
CERTIFICATE OF CORRECTION

PATENT NO. : 5,094,128

DATED : March 10, 1992

INVENTOR(S) : SHINYA KAMADA

It is certified that error appears in the above-identified patent and that said Letters Patent is hereby corrected as shown below:

Col. 12, line 9 (Claim 5), "rotationalfrequency" s/b --rotational-frequency--;

line 14 (Claim 5), "rotationalfrequency" s/b --rotational-frequency--.

Signed and Sealed this

Ninth Day of November, 1993

Attest:

BRUCE LEHMAN

*Attesting Officer*         *Commissioner of Patents and Trademarks*